(12) United States Patent
Khalyapin et al.

(10) Patent No.: US 10,649,709 B1
(45) Date of Patent: *May 12, 2020

(54) LOCATION-BASED UNIVERSAL PRINTING USING REMOTE APPLICATION SERVERS

(71) Applicant: Parallels International GmbH, Schaffhausen (CH)

(72) Inventors: Alexander Khalyapin, Moscow (RU); Serguei M. Beloussov, Costa Del Sol (SG); Nikolay Dobrovolskiy, Moscow (RU)

(73) Assignee: PARALLELS INTERNATIONAL GMBH, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/183,842

(22) Filed: Nov. 8, 2018

Related U.S. Application Data

(63) Continuation of application No. 15/700,277, filed on Sep. 11, 2017, now Pat. No. 10,152,290.

(51) Int. Cl.
*G06F 3/12* (2006.01)
*G06F 9/455* (2018.01)

(52) U.S. Cl.
CPC .......... *G06F 3/1296* (2013.01); *G06F 3/1204* (2013.01); *G06F 3/1226* (2013.01); *G06F 3/1232* (2013.01); *G06F 3/1236* (2013.01); *G06F 3/1256* (2013.01); *G06F 3/1288* (2013.01); *G06F 9/45533* (2013.01)

(58) Field of Classification Search
None
See application file for complete search history.

(56) References Cited

U.S. PATENT DOCUMENTS

| 6,552,813 | B2* | 4/2003 | Yacoub | G06F 3/1204 358/1.1 |
| 8,159,703 | B2* | 4/2012 | Murase | G06F 3/1204 358/1.1 |
| 8,953,192 | B2* | 2/2015 | Gutnik | G06F 3/1222 358/1.14 |
| 9,134,936 | B2* | 9/2015 | Monden | G06F 3/1232 |
| 2003/0011805 | A1* | 1/2003 | Yacoub | G06F 3/1204 358/1.15 |
| 2004/0218201 | A1* | 11/2004 | Lermant | G06F 3/1205 358/1.13 |
| 2010/0020349 | A1* | 1/2010 | Carroll | G06F 3/121 358/1.15 |

(Continued)

*Primary Examiner* — Dung D Tran
(74) *Attorney, Agent, or Firm* — Lowenstein Sandler LLP

(57) ABSTRACT

Disclosed are systems and methods for managing a print job in a virtual environment. The described technique includes associating a physical printer with a chosen virtual printer which may be used by the user in the remote application to execute. A remote application server can receive from a remote application a request to choose a virtual printer in a remote session established between the client device and a remote application server. A tag associated with the print job that indicates one or more parameters of the virtual printer is determined, as well as a location of the client device. The technique includes selecting a physical printer from a plurality of available printers in the remote session based on the determined location and the determined tag of the virtual printer. An association with the virtual printer is generated and saved, and may be used for a subsequent print job.

17 Claims, 7 Drawing Sheets

(56) References Cited

U.S. PATENT DOCUMENTS

| | | | |
|---|---|---|---|
| 2013/0201522 A1* | 8/2013 | Ohashi | G06F 3/1296 358/1.15 |
| 2014/0063553 A1* | 3/2014 | Bhatia | G06F 3/1204 358/1.15 |
| 2014/0092429 A1* | 4/2014 | Srinivasmurthy | H04N 1/00278 358/1.15 |
| 2015/0160900 A1* | 6/2015 | Kang | G06F 3/1222 358/1.14 |

* cited by examiner

US 10,649,709 B1

LOCATION-BASED UNIVERSAL PRINTING USING REMOTE APPLICATION SERVERS

CROSS-REFERENCE TO RELATED APPLICATIONS

This application is a continuation of prior U.S. patent application Ser. No. 15/700,277, filed Sep. 11, 2017, which is incorporated by reference herein.

FIELD OF TECHNOLOGY

The present disclosure relates generally to the field of managing distributed resources in a virtual environment, more specifically, to systems and methods of executing a print job in a virtual environment using available printers distributed across multiple locations.

BACKGROUND

The expansion of business operations across geographically distributed offices (sites) has encouraged the widespread adoption of virtualization and network technologies, such as virtual desktops. Such technologies enable users to remotely access computing resources and data across different sites and in different geographies. However, such technologies also present some challenges with regard to use of peripheral devices, such as printers. For example, when seeking to print a document, a user within an enterprise network might be presented with all of the networked printers within the enterprise, potentially hundreds of printers and peripheral devices, which might be in different buildings or even in different geographical regions (e.g., cities, countries). A user can easily misidentify an appropriate printer. Misidentification of the correct peripheral device can result in wasted media resources (e.g., paper), as well as wasted time in tracking down where within the organization the printed documents can be found. Additional issues also include security concerns, in cases in which printed documents are inadvertently transmitted and exposed to locations which should not have the documents.

Accordingly, what is needed is a system and method for providing a more secure and more reliable mechanism for selecting peripherals devices such as printers in a multi-site virtualized environment.

SUMMARY

Thus, a system and method is disclosed herein for managing resources across multiple sites, and, more particularly, for executing print jobs in a virtual environment having resources distributed across multiple sites.

According to one exemplary aspect, a method for managing by an application server a print job in a virtual environment. The method includes receiving, by the application server, a request from a client device to choose a virtual printer in a remote session established between the client device and the application server, and determining a tag associated with the virtual printer. The tag indicates one or more capabilities that an available printer requires to execute a printing job of the virtual printer. The method further includes, responsive to determining that a plurality of available printers in the remote session are all associated with the same tag, selecting a physical printer from the plurality of available printers in the remote session based on a proximity to a location of the client device. The method includes generating an association between the selected physical printer and the virtual printer for use with a printing job, and transmitting the print job for printing based on the generated association.

In another aspect, the method further includes determining the location of the client device based on a network address of the client device.

In another aspect, each of the plurality of available printers is mapped to a location on a site by each corresponding network address according to an Internet Protocol (IP) mask.

In another aspect, wherein the location of the client device is determined to be within a predefined office site, and wherein the selected physical printer from the plurality of available printers is selected based on proximity within the predefined office site.

In another aspect, the method further includes, in response to moving the client device from a first location to a second location, choosing a different printer based on the second location of the client device.

In another aspect, the plurality of available printers are communicatively connected to the client device through at least one of a local connection to the client device, to a network connection to a print service of the application server, and through a cloud connection.

In another aspect, the association is generated by: saving a reference to the selected physical printer in a driver-specific portion of a device-mode data structure associated with the virtual printer, and creating in the remote session a printer device context associated with the virtual printer and based on the device-mode data structure.

According to another aspect, a system for managing by an application server a print job in a virtual environment is provided. The system includes a hardware processor configured to receive a request from a client device to choose a virtual printer in a remote session established between the client device and the application server, and determine a tag associated with the virtual printer. The tag indicates one or more capabilities that an available printer requires to execute a printing job of the virtual printer. The hardware processor is further configured to, responsive to determining that a plurality of available printers in the remote session are all associated with the same tag, select a physical printer from the plurality of available printers in the remote session based on a proximity to a location of the client device. The hardware processor is further configured to generate an association between the selected physical printer and the virtual printer for use with a printing job, and transmit the print job for printing based on the generated association.

According to another exemplary aspect, a computer-readable medium is provided comprising instructions that comprises computer executable instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for executing a print job in a virtual environment. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
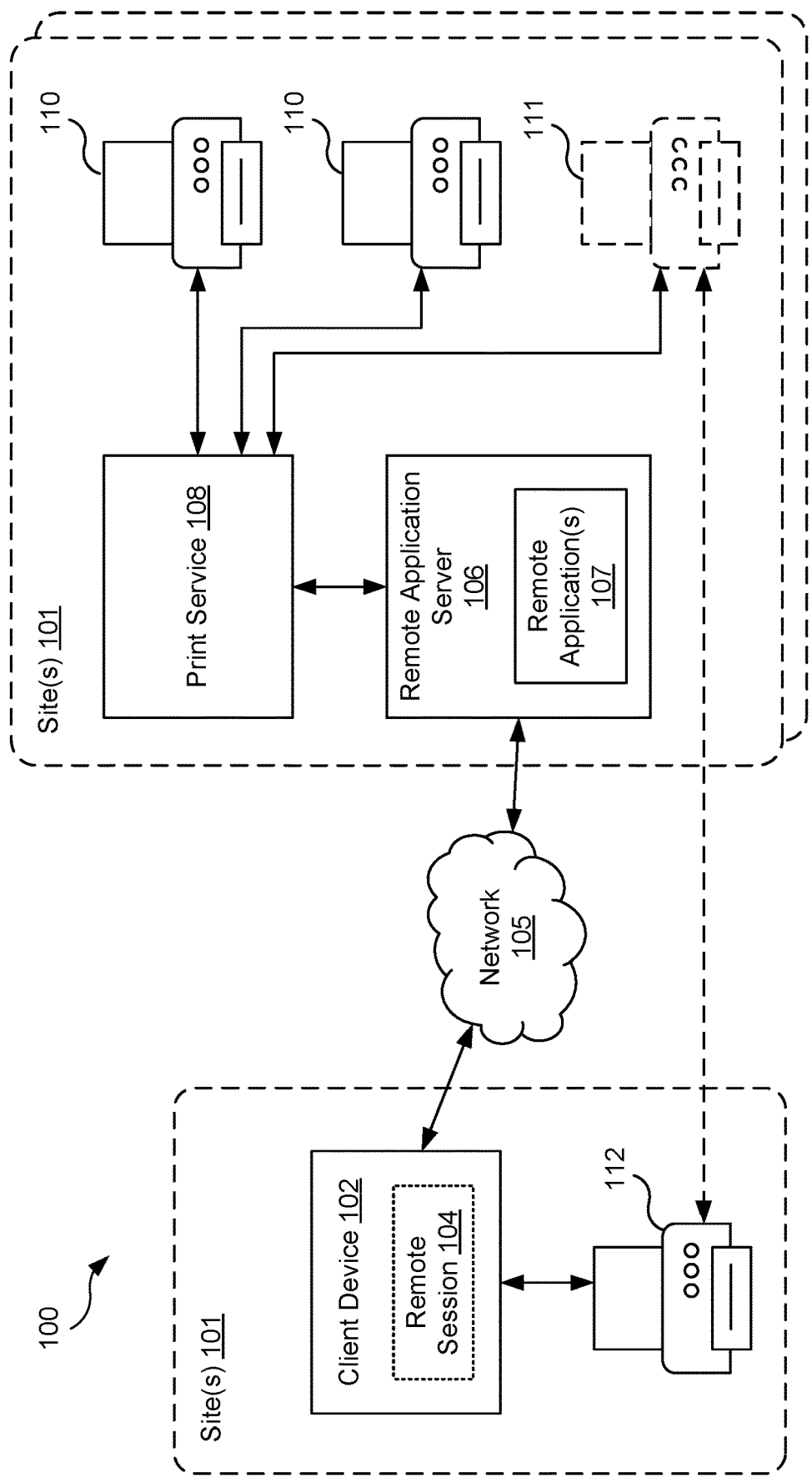
FIG. 1 is a block diagram illustrating a system for executing a print job in a virtual environment according to an exemplary aspect.

FIG. 1 is a block diagram illustrating a system 100 for executing a print job in a virtual environment according to an exemplary aspect. The system 100 includes a client device 102 communicatively connected to a remote application server 106 via a network 105. The system 100 further includes a print service 108 (sometimes also referred to as a printer service) configured to communicatively connect a plurality of printers 110 within the system 100 to application instances running on Remote Application Server 106 and provided by it to client computers (e.g., client device 102). In some aspects, the RAS 106 may communicate the print service 108, which may provide access to a plurality of printers 110 physically or communicatively connected to a printer server. In one implementation, the print service 108 may be a type of system application running on a same node where a remote application 107 is running and is configured to provide access to printers 110 to other applications on the same node.

In some aspects, a printer 110 is a computer peripheral device configured to put text and/or graphics on paper or other physical medium, such as transparency film. The printers 110 may use execute one or more print jobs using any suitable print technology, for example, pin dot-matrix, ink-jet, laser, and thermal printing technologies. In some aspects, at least one of the printers 110 may be a 3D printer configured to create three-dimensional objects using a manufacturing process by which layers of material are formed under computer control. In some aspects, a printer 110 may be a virtual device 111 (rather than a physical device) presented by a Universal Printer Driver provided by Remote Application Server 106. In such a case, Universal Printer Driver redirects control and data flow for the virtual printer 111 to/from a physical printer 112 which may be connected e.g. to the client device 102. In one implementation, the universal printer driver may be implemented using a number of modules (e.g., DLLs) which are used by the print server process and also by its DLL which is loaded into application. In this way, all universal printer driver modules can be in the same node where remote application is running.

The remote application server 106 may be configured to remotely provide instances of software applications (referred to herein as remote applications 107) to the client device 102. The remote application server (RAS) may be a virtual application and desktop delivery system that allows users to access and use applications and data from any device (e.g., client device 102) in any of the sites 101. In one aspect, the client device 102 may be configured to establish a remote session 104 with the remote application server 106 that provides one or more applications at the client device 102 that might not be otherwise available or installed locally on the client device 102.

In some aspects, the remote session 104 may provide a virtual desktop environment, sometimes referred to as a virtual desktop infrastructure (VDI) for executing applications and accessing data (e.g., private files). While the print service 108 is depicted in FIG. 1 as a separate component from the remote application server 106, it is noted that in some aspects the print service may contain modules within the remote application server 106. For example, the print service 108 may be a process which uses modules or libraries (e.g., DLLs) provided by the remote application server 106.

In one aspect, components of the system 100 may be distributed across a plurality of sites 101, which are localities that contain one or more components that are communicatively connected by one or more networks, such as a local area network (LAN). The sites 101 themselves may be interconnected by one or more networks (e.g., network 105), such as a wide area network (WAN). By way of example, the system 100 may include a first site containing the client device 102 and a printer 110 in an office located in a first building, and a second site containing the backend servers (e.g., remote application server 106) and additional printers 110 in another office located in a second, different building (possibly in a different geographical region, e.g., city). In another example, the system 100 may further include a site comprised of a user's home, having the user's home computer and home printer.

In operation, a user may initiate a print request using one of the applications executing in the remote session 104. For example, the user initiates a print request of a document file accessed using a word processing application, such as Microsoft Word®, in the remote session 104. In some aspects, the client device 102 may be configured to display a graphical user interface (e.g., a print menu) that presents the user with a plurality of printer tags to choose. The client device 102 may receive input, from the user, indicating the user has chosen the relevant printer tag, depending on the type of document and printing desired. According to one exemplary aspect, the RAS 106 is configured to determine and assign a most suitable printer from a list of available printers to a universal printer driver on the server side. The needed printer for the assignment can be chosen by the system 100 according to the necessary properties of printing selected by the user using the tags. If there are several printers with the same tag, the most suitable will be selected according to a determined location of the client device 102 (or another parameter). In one aspect, the title of the assigned printer may be presented to the user in order to inform the user where exactly the printing will be performed. The client device 102 may be configured to provide a graphical user interface indicating a print confirmation screen that displays information about the selected printer (e.g., identifier, location). In some aspects, the graphical user interface may provide an option to the user to change the selected printer to a different printer. In some implementations, the graphical user interface may be a menu displaying the selected printer as a pre-selected option and other printers that also satisfied the criteria (indicated by the tags) as alternative options. An exemplary method for automatically selecting a printer for executing a print job according to a method shown in FIG. 4 below.

As described in greater detail below, according to such a schema, when the user is moving between sites 101 (e.g., between offices and home), the user does not need to select the needed printer from the list of available printers every time, but rather, the system 100 is configured to perform the selection automatically for the user. In some aspects, the scheme can cover every available printer 110 connected to the system 100, such as through a cloud service, through a local connection to the client device 102, and through a local connection to the server where remote application server 106 is running. In one aspect, the remote application server 106 may be set up to perform automatic printer selection, using an initial configuration process described in detail in conjunction with FIG. 2.

Figure 2:
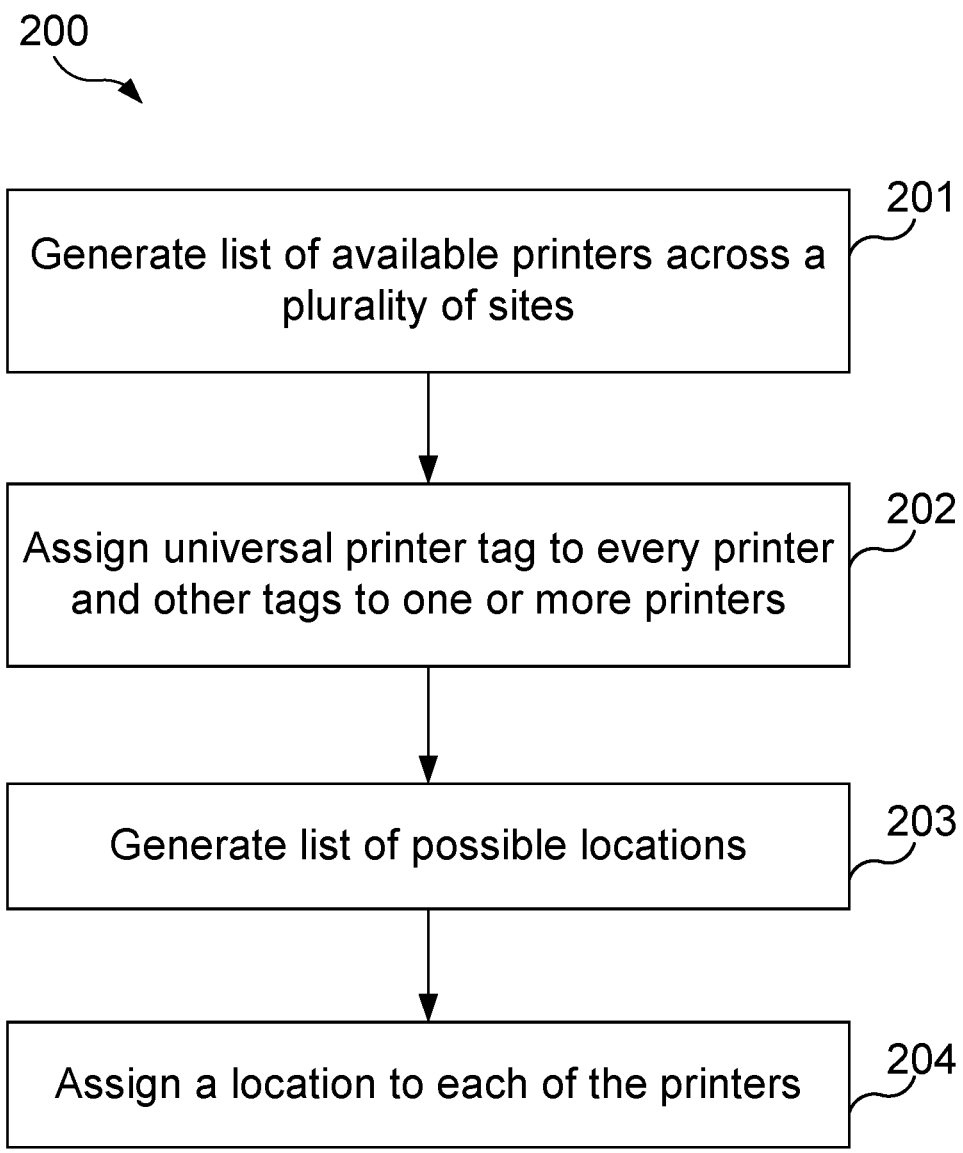
FIG. 2 is a flowchart illustrating a method for configuring a system to assign printers to a print job in a virtual environment according to an exemplary aspect.

FIG. 2 is a flowchart illustrating a method 200 for configuring a system to assign printers to a print job in a virtual environment according to an exemplary aspect. It is noted that the following description of the exemplary method makes reference to the system and components described above.

The method 200 begins at step 201, in which the RAS 106 may generate a list of available printers 110 across a plurality of sites 101 within the organization. In some aspects, the RAS 106 with the help of print service 108 may execute a discovery process that automatically detects and connects to (e.g., registers) printers 110 within a site, for example, using a service discovery protocol such as the Service Location Protocol (SLP) to find available printers 110 within a local area network of a site 101. In other aspects, the print service 108 may receive user input (e.g., via a graphical user interface) specifying the configuration and specification details of one or more available printers 110 within a site to register a printer. It is noted that the RAS 106 may continue to maintain the list of available printers, such that as printers are subsequently added or removed from the network, the list is updated accordingly. It is further noted that the operations of the method 200 may be performed upon initial setup as well as at subsequent times, for example, responsive to determining that a new printer has been added to the network.

At step 202, the RAS 106 may assign tags to one or more of the printers 110 (e.g., in response to user input), wherein the tags specify a capability of the respective printer to execute a type of print job. Examples of printer capabilities that may be expressed by a tag include color settings, duplex capabilities, paper sizes, letterhead availability, or any combination thereof. Each printer 110 can be associated with one or several tags. An administrator may configure a pool of template tags that are provided to a user, and the user can assign a tag from this provided list of predefined tags. In other aspects, the user may create the template tags themselves.

In one aspect, the RAS 106 may assign a universal printer tag to one or more printers 110 on the list of available printers 110. This may be performed automatically for every printer 110. Thus, if a printer 110 has no tags assigned by a user or administrator, the printer 110 has only the default universal printer tag. An example of tag assignments is described in further detail in conjunction with FIG. 3.

Figure 3:
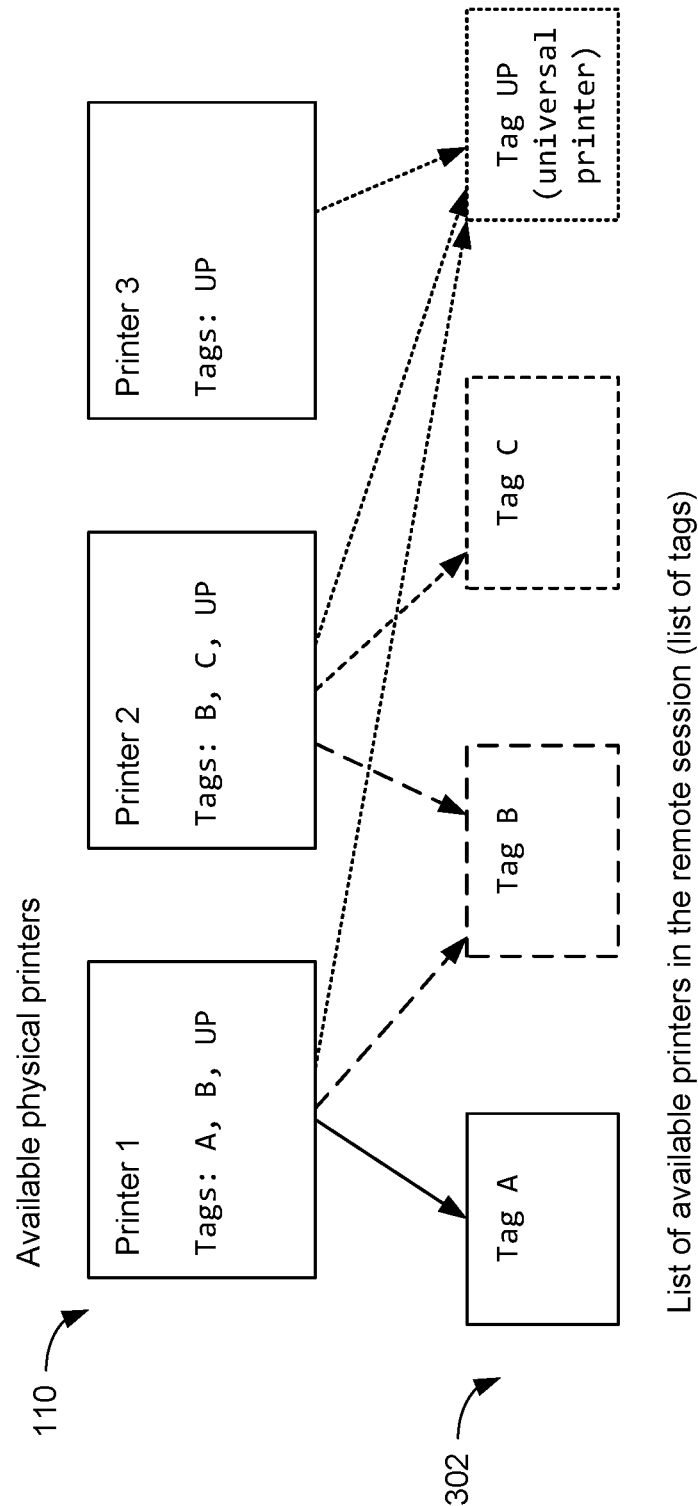
FIG. 3 is a block diagram illustrating a plurality of printers and assignments with a plurality of tags according to an exemplary aspect.

FIG. 3 is a block diagram illustrating a plurality of available printers 110 and assignments with a plurality of tags according to an exemplary aspect. In the example depicted in FIG. 3, the RAS 106 has generated a list of available printers in the remote session 104, including Printer 1, Printer 2, and Printer 3.

According to one aspect, the RAS 106 has assigned one or more tags 302 to each of the printers 110, including Tags A, B, C, and UP. The assignment of tags is depicted in FIG. 3 with a directional line. In one example, the RAS 106 has assigned to Printer 1 a tag ("Tag A") that specifies that the respective printer is able to print color documents (i.e., "Color for documents"). The RAS 106 has assigned to Printer 1 and Printer 2 a second tag ("Tag B") that specifies that the corresponding printers are configured to print black and white documents (i.e., "monochrome print"). In another example, the RAS 106 has assigned to Printer 2 a tag specifying the respective printer is authorized for printing secret documents ("Tag C"). Such a printer tag may be useful for enforcing information security in the context of printer location, e.g. to avoid passing a secret document to a wrong printer. The RAS 106 assigns to all of the printers a universal printer tag ("Tag UP"). As described earlier, a printer can be associated with several tags. For example, Printer 1 is associated with Tags A, B, and UP; Printer 2, with tags B, C, and UP; and Printer 3 has no tags except for the universal printer tag.

Referring back to FIG. 2, the method 200 continues at step 203, in which the RAS 106 generates a list of possible locations within the system 100. The list of possible locations may be created or edited in response to user input (e.g., by an administrator). In some aspects, a location may be specified according to a site identifier corresponding to a particular site 101. In other aspects, a location may be specified according to other parameters and identifiers, alone or in combination, based on geographical information (e.g., GPS coordinates), network addressing information (e.g., Internet Protocol or IP addresses, subnets), architectural information (e.g., room and floor number in a building), and other information.

At step 204, the RAS 106 assigns a location to each of the printers 110. In some aspects, any of the printers 110 that an administrator has added to a pool of printers involved in the selection may be assigned a location in response to user input (e.g., from the administrator). In other aspects, the RAS 106 may assign a location to a printer according to automatic location detection. In some aspects, the RAS 106 may determine the location of a printer according to one or more rules (e.g., created by the administrator) that map the network address (e.g., IP address) of the printer with a location in a site 101, for example using an IP mask. In another aspect, the remote application server 106 may use a third-party library that provides an interface, such as an application programming interface (API), for determining the location based on IP address.

When a user would like to print a document from a remote application executing in the remote session 104, the user indicates the appropriate tag, depending on the type of document and printing to be performed. In some aspects, a graphical user interface presented at the client device 102 presents a plurality of tags (e.g., tags 302) that have at least one available printer assigned to it. The tags 302 may be presented in the list of available printers and include the universal printer tag (to which the most suitable printer is assigned without considering tags, even when printers are without tags at all). In cases when there are no tags in the system 100 at all, for the user, only one universal printer may be shown.

Figure 4:
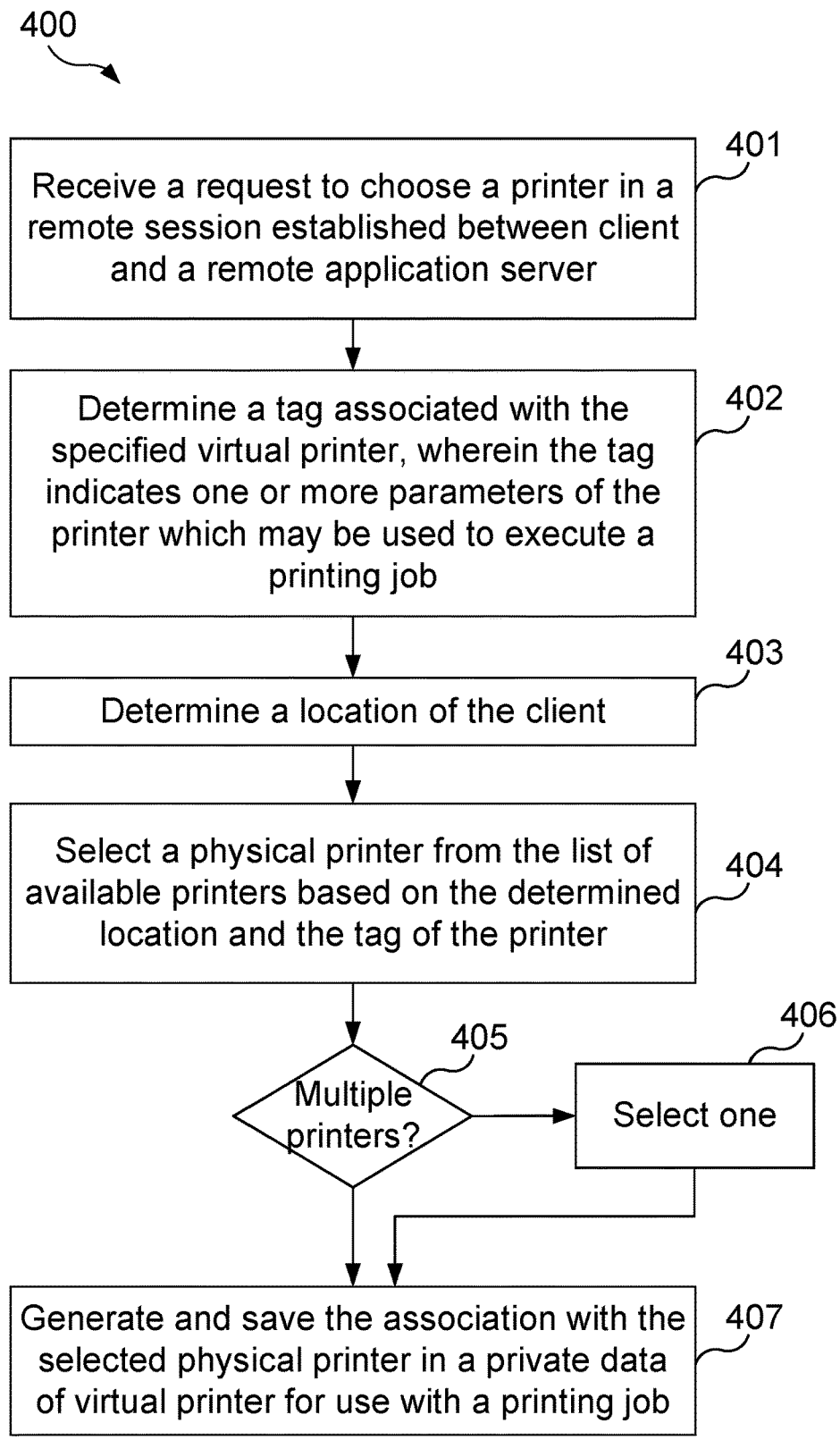
FIG. 4 is a flowchart illustrating a method for associating a physical printer with a chosen virtual printer which may be used by the user in a remote application to execute a print job in a virtual environment according to an exemplary aspect.

FIG. 4 is a flowchart illustrating a method 400 for associating a physical printer with a chosen virtual printer which may be used by the user in the remote application to execute a print job in a virtual environment according to an exemplary aspect. It is noted that the following description of the exemplary method makes reference to the system and components described above.

The method 400 begins at step 401, in which RAS 106 receives from the remote application and initiated by client device 102 request to choose a printer in a remote session 104 established between the client device 102 and a remote application server 106. In one implementation, a print job is created after the printer is chosen by the remote application (e.g., by the user via a GUI provided by the remote application). After that, the remote application creates a printing job and passes data to it. A printer service (e.g., print spooler) receives the printing job data and passes the job to the universal printer driver. For example, the remote application may call directly or indirectly using a system API call or dialog functions (e.g., Win32 API functions like PrintDlg, PrintDlgEx, or PageSetupDlg) to show a dialog GUI where a user may choose a printer. Responsive to an indication that the user has specified a virtual printer (e.g., in the dialog GUI), the RAS 106 may perform a printer identification process to find the appropriate physical printer for the selected virtual one, as described below.

At step 402, the RAS 106 determines a tag (or multiple tags) associated with the virtual printer. The tag(s) indicate(s) one or more parameters of the printer which may be used to execute a printing job. In some aspects, the tag associated with a printer indicates the capabilities of an available printer would need to properly execute a print job. For example, the RAS 106 may determine that the user has selected a printer with a tag specifying "color for documents." In some aspects, RAS 106 may select the most appropriate printer for executing the print job based on the determined tag. In other aspects, RAS 106 may factor in other parameters into consideration, including the location of the available printers and the client device, as noted in the following steps.

At step 403, the RAS 106 determines a location of the client device 102. In some aspects, the RAS 106 may determine the location based on a network address (e.g., IP address) of the client device. In one aspect, the RAS 106 may determine where the client device 102 is from the list of possible locations (e.g., as determined in step 203). RAS 106 may determine a location from the list of possible locations that is closest to or that satisfies a threshold proximity one of the possible locations based on network addressing information and/or geographical information.

At step 404, the RAS 106 selects a physical printer from the plurality of available printers in the remote session based on the determined location and the determined tag of the virtual printer (i.e., selection criteria). If the location of the client device has been determined, then one or more printers are selected from the available list of printers that has the desired tag and the location of which coincides with the location of the client device 102. In some aspects, if none of the possible locations of printers 110 match the client device's location (e.g., based on the IP address), then an arbitrary printer may be assigned. For example, an arbitrary printer may be selected from a pool of printers have the selected tag. In another example, a default printer may be selected instead, in aspects without assigned tags.

At step 405, the RAS 106 determines whether selection criteria correspond to multiple printers 110. If so, at step 406, responsive to determining that multiple ("candidate") physical printers satisfy the selection criteria of the virtual printer, the RAS 106 may select one of the candidate printers using any suitable tie breaker criteria. For example, the RAS 106 may choose an arbitrary one of the candidate printers based on a pseudo-random number generator scheme, or a round-robin scheme. In some aspects, RAS 106 may provide an option to change the selected physical printer, for example, to one of the other candidate printers that satisfied the selection criteria of the virtual printer as specified by tags. If the selection criteria correspond to a single printer 110, RAS 106 selects that single printer as the selected physical printer for the chosen virtual printer.

At step 407, the RAS 106 may generate an association with the selected physical printer in a private data of virtual printer to use it for a printing job. The RAS 106 may save the association with the physical printer in a device mode data structure associated with the virtual printer. Such a device mode data structure generally contains information about the initialization and environment of the virtual printer. In one implementation, the RAS 106 may save a reference to the physical printer in a private driver-specific data portion of the virtual printer's DEVMODE data structure, as provided by a Windows® environment.

In some aspects, after completion of the user selection of the virtual printer, the remote application 107 may use the device mode data structure and device name to create a printer device context associated with the virtual printer. The printer device context may be a data structure that defines a set of graphic objects and their associated attributes and specifies the graphic modes that affect output. For example, after returning from the Windows dialog functions, the remote application either has a device context handle or a chosen (virtual) printer device name and its DEVMODE. In the latter case, the remote application use the DEVMODE and device name to create a device context. Responsive to creating the device context, the remote application 107 may use it to perform a printing job, and the RAS 106 uses the appropriate physical printer for that job since it has saved the associated with the physical printer in the device mode data structure (e.g., DEVMODE) of the virtual printer used for the device context.

In some aspects, the RAS 106 may transmit a print job to a physical printer based on the saved association of the selected physical printer with a virtual printer. The print job includes a file or set of files from the remote session 104 to be printed. In some aspects, the print job may include additional metadata such as a destination identifier associated with the selected printer and printing properties specifying the parameters of the print job (e.g., color, paper or media size, number of copies, etc.). Upon receipt, the selected printer 110 executes the print job and prints the received file(s) according to the specified print parameters.

Figure 5A:
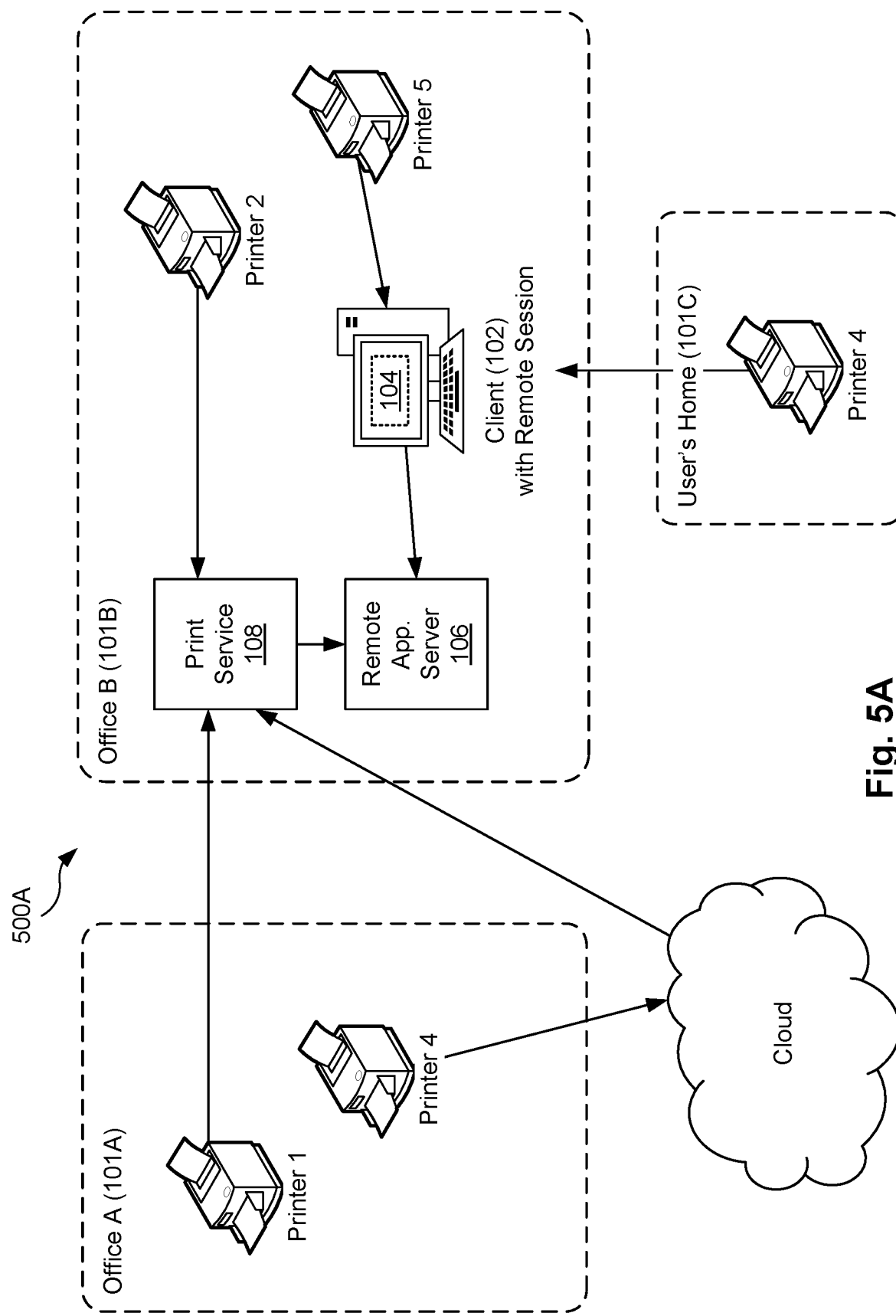
FIGS. 5A and 5B are block diagrams illustrating various scenarios for selecting printers distributed across multiple locations according to an exemplary aspect.
Figure 5B:
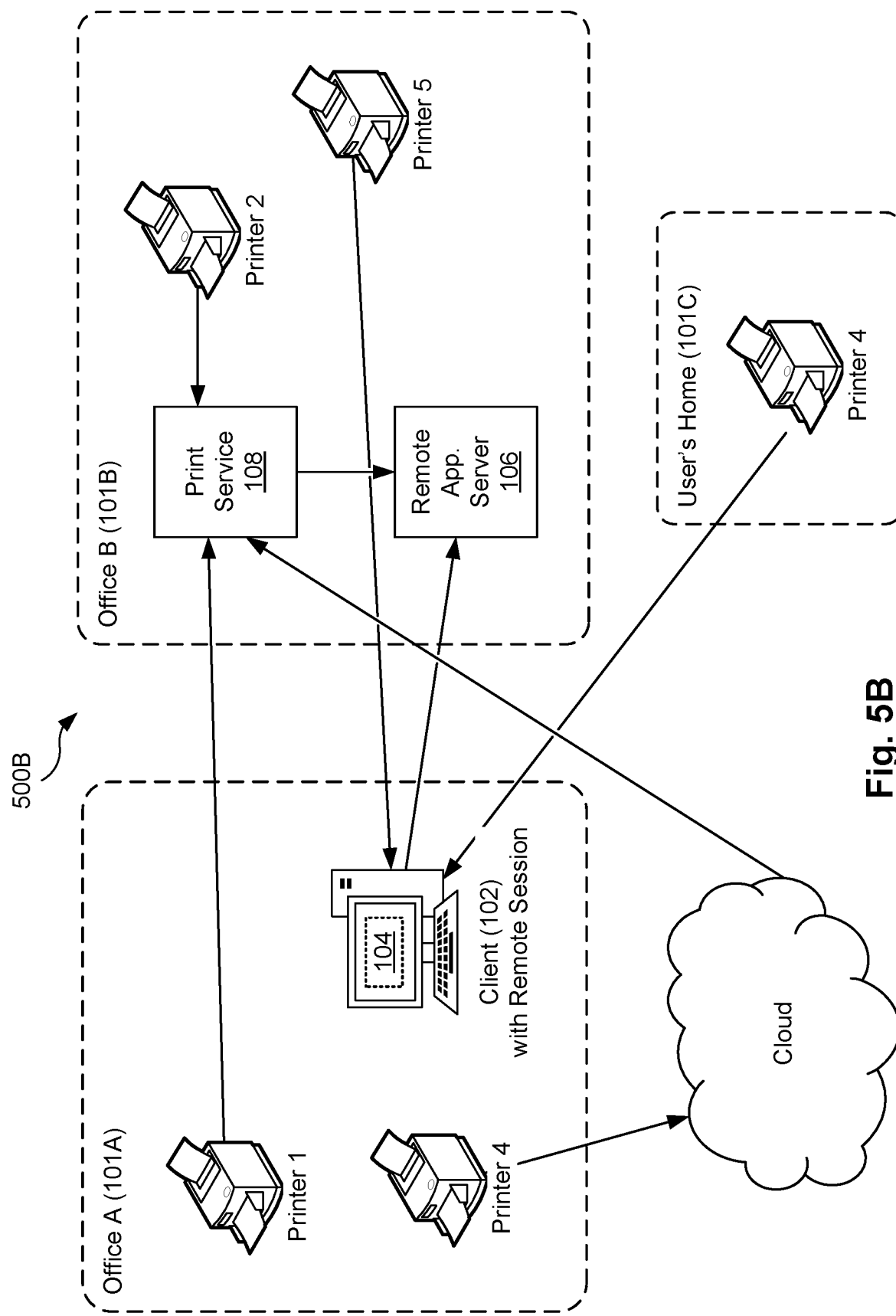

FIGS. 5A and 5B are block diagrams illustrating various scenarios 500A, 500B for selecting printers distributed across multiple locations according to an exemplary aspect. In both scenarios depicted, the system 100 includes a plurality of printers (Printers 1 to 5) distributed across multiple sites 101A, 101B, and 101C. A first site 101A representing a first office ("Office A") contains Printer 1 and Printer 3. A second site 101B representing a second office ("Office B") contains Printer 2 and Printer 5, as well as the remote application server 106. Printer 3 may be communicatively connected to the print service 108 using a cloud service or cloud connection as shown in FIGS. 5A and 5B. A third site 101C representing a user's home office ("User's Home") contains Printer 4. In the scenario 500A, the second site 101B includes a client device 102 executing a remote session 104 with the remote application server 106.

In operation, RAS 106 generates a list of possible locations containing Office A, Office B, and User's Home. RAS 106 assigns each of the Printers 1-5 to the respective locations (Office A, Office B, Office A, User's Home, and Office B, respectively) based on network address information or other data. RAS 106 may further assign one or more tags to the Printers 1-5 (as in the step 202 of method 200 described earlier).

Responsive to receiving user input indicating a request to choose a printer for printing a document within the remote session 104, the remote application server 106 may determine the location of the client device. In scenario 500A, the RAS 106 determines the location of the client device 102 as within Office B, and identifies one or more printers that are proximate to or located at Office B. In this case, the document will be printed using Printer 2 or Printer 5 (depending in preference or actual location).

In scenario 500B, the client device 102 has moved to a different location, specifically from Office B to Office A. The client device 102 is again executing a remote session 104 with the remote application server 106, although the client device 102 and remote application server 106 are located in separate locations, e.g., sites 101. Upon submitting a printer selection request, the RAS 106 determines the location of the client device 102 as Office A. In response to detecting the client device has moved from a first location to a second location, RAS 106 may choose a different printer based on the second location of the client device. In this scenario 500B, the document will be printed with the help of Printer 1 or Printer 3. That is, RAS 106 selects the printers 1 and 3 based on the determined locations (and tags), even though the print request originates from the remote session 104 established with the remote application server 106 which is located at Office B.

Figure 6:
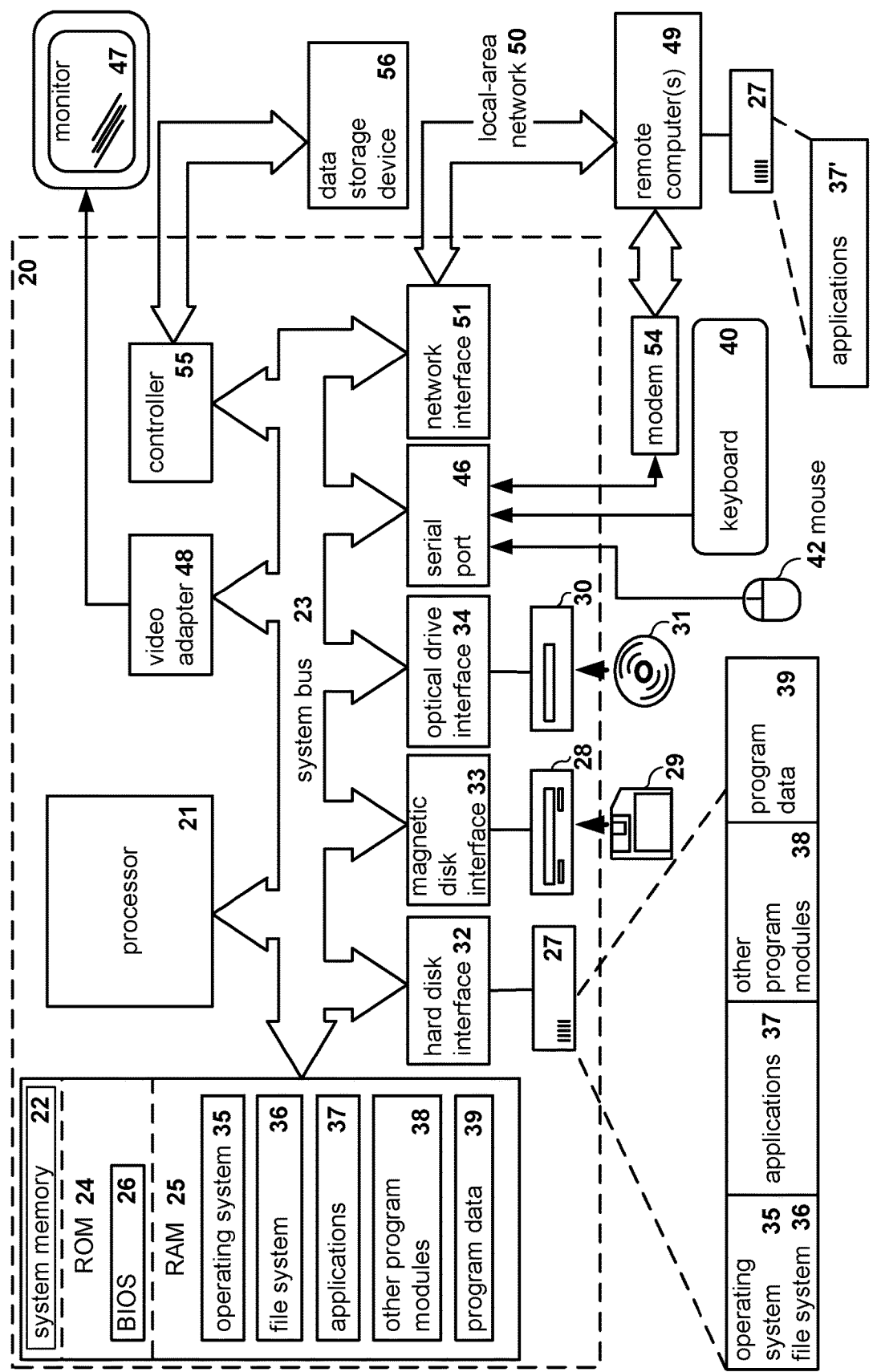
FIG. 6 is a block diagram of a general-purpose computer system on which the disclosed system and method can be implemented according to an exemplary aspect.

FIG. 6 is a block diagram illustrating a general-purpose computer system 20 on which aspects of systems and methods for associating a physical printer with a chosen virtual printer which may be used by the user in the remote application to execute a print job in a virtual environment may be implemented in accordance with an exemplary aspect. It should be noted that the computer system 20 can correspond to the client device 102 or remote application server 106, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 6, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for managing by an application server a print job in a virtual environment, the method comprising:
   receiving, by the application server, a request from a client device to choose a virtual printer in a remote session established between the client device and the application server;
   selecting a physical printer from a plurality of available printers in the remote session;
   generating an association between the selected physical printer and the virtual printer for use with the print job by:
      saving a reference to the selected physical printer in a driver-specific portion of a device-mode data structure associated with the virtual printer;
      creating in the remote session a printer device context associated with the virtual printer and based on the device-mode data structure; and
   transmitting the print job for printing based on the generated association.

2. The method of claim 1, wherein selecting the physical printer comprises:
   determining a location of the client device based on a network address of the client device;
   determining a tag associated with the virtual printer, wherein the tag indicates one or more capabilities that an available printer requires to execute a printing job of the virtual printer;
   responsive to determining that the plurality of available printers in the remote session are all associated with the determined tag, selecting the physical printer from the plurality of available printers in the remote session based on a proximity to the location of the client device.

3. The method of claim 2, wherein the location of the client device is determined to be within a predefined office site, and wherein the selected physical printer from the plurality of available printers is selected based on proximity within the predefined office site.

4. The method of claim 1, wherein each of the plurality of available printers is mapped to a location on a site by each corresponding network address according to an Internet Protocol (IP) mask.

5. The method of claim 1, further comprising:
   in response to moving the client device from a first location to a second location, choosing a different printer based on the second location of the client device.

6. The method of claim 1, wherein the plurality of available printers are communicatively connected to the client device through at least one of a local connection to the client device, to a network connection to a print service of the application server, and through a cloud connection.

7. A system for managing by an application server a print job in a virtual environment, the system comprising:
   a hardware processor configured to:
      receive a request from a client device to choose a virtual printer in a remote session established between the client device and the application server;
      select a physical printer from a plurality of available printers in the remote session;
      generate an association between the selected physical printer and the virtual printer for use with the print job by:
         saving a reference to the selected physical printer in a driver-specific portion of a device-mode data structure associated with the virtual printer, and
         creating in the remote session a printer device context associated with the virtual printer and based on the device-mode data structure; and transmit the print job for printing based on the generated association.

8. The system of claim 7, wherein the hardware processor is further configured to select the physical printer by:
  determining a location of the client device based on a network address of the client device;
  determining a tag associated with the virtual printer, wherein the tag indicates one or more capabilities that an available printer requires to execute a printing job of the virtual printer;
  responsive to determining that the plurality of available printers in the remote session are all associated with the determined tag, selecting the physical printer from the plurality of available printers in the remote session based on a proximity to the location of the client device.

9. The system of claim 8, wherein the location of the client device is determined to be within a predefined office site, and wherein the selected physical printer from the plurality of available printers is selected based on proximity within the predefined office site.

10. The system of claim 7, wherein each of the plurality of available printers is mapped to a location on a site by each corresponding network address according to an Internet Protocol (IP) mask.

11. The system of claim 7, wherein the hardware processor is further configured to:
  in response to moving the client device from a first location to a second location, choose a different printer based on the second location of the client device.

12. The system of claim 7, wherein the plurality of available printers are communicatively connected to the client device through at least one of a local connection to the client device, to a network connection to a print service of the application server, and through a cloud connection.

13. A non-transitory computer readable medium comprising computer executable instructions for managing by an application server a print job in a virtual environment, including instructions for:
  receiving, by the application server, a request from a client device to choose a virtual printer in a remote session established between the client device and the application server;
  selecting a physical printer from a plurality of available printers in the remote session;
  generating an association between the selected physical printer and the virtual printer for use with the print job by:
    saving a reference to the selected physical printer in a driver-specific portion of a device-mode data structure associated with the virtual printer, and
    creating in the remote session a printer device context associated with the virtual printer and based on the device-mode data structure; and
  transmitting the print job for printing based on the generated association.

14. The non-transitory computer readable medium of claim 13, further comprising instructions for:
  determining a location of the client device based on a network address of the client device;
  determining a tag associated with the virtual printer, wherein the tag indicates one or more capabilities that an available printer requires to execute a printing job of the virtual printer;
  responsive to determining that the plurality of available printers in the remote session are all associated with the determined tag, selecting the physical printer from the plurality of available printers in the remote session based on a proximity to the location of the client device.

15. The non-transitory computer readable medium of claim 14, wherein the location of the client device is determined to be within a predefined office site, and wherein the selected physical printer from the plurality of available printers is selected based on proximity within the predefined office site.

16. The non-transitory computer readable medium of claim 13, wherein each of the plurality of available printers is mapped to a location on a site by each corresponding network address according to an Internet Protocol (IP) mask.

17. The non-transitory computer readable medium of claim 13, further comprising instructions for:
  in response to moving the client device from a first location to a second location, choosing a different printer based on the second location of the client device.

* * * * *